United States Patent
Zhao et al.

(10) Patent No.: US 11,436,228 B2
(45) Date of Patent: Sep. 6, 2022

(54) METHOD FOR ENCODING BASED ON MIXTURE OF VECTOR QUANTIZATION AND NEAREST NEIGHBOR SEARCH USING THEREOF

(71) Applicant: ODD CONCEPTS INC., Seoul (KR)

(72) Inventors: Wan Lei Zhao, Xiamen (CN); San Whan Moon, Seoul (KR)

(73) Assignee: ODD CONCEPTS INC., Seoul (KR)

( * ) Notice: Subject to any disclaimer, the term of this patent is extended or adjusted under 35 U.S.C. 154(b) by 220 days.

(21) Appl. No.: 16/499,789

(22) PCT Filed: Jun. 20, 2017

(86) PCT No.: PCT/KR2017/006450
§ 371 (c)(1),
(2) Date: Feb. 12, 2020

(87) PCT Pub. No.: WO2018/182093
PCT Pub. Date: Oct. 4, 2018

(65) Prior Publication Data
US 2020/0226137 A1 Jul. 16, 2020

(30) Foreign Application Priority Data
Mar. 30, 2017 (KR) .................... 10-2017-0041017

(51) Int. Cl.
*G06F 16/2455* (2019.01)
*G06F 16/22* (2019.01)

(52) U.S. Cl.
CPC .... *G06F 16/24553* (2019.01); *G06F 16/2237* (2019.01)

(58) Field of Classification Search
CPC ............... G06F 16/2237; G06F 16/24; G06F 16/24553; G06F 16/43
See application file for complete search history.

(56) References Cited

U.S. PATENT DOCUMENTS

| | | | |
|---|---|---|---|
| 2004/0049502 A1* | 3/2004 | Choi | G06F 16/30 |
| 2009/0019044 A1* | 1/2009 | Shibata | G06K 9/6276 |
| 2014/0129214 A1* | 5/2014 | Ashley | G10L 19/083 |
| | | | 704/219 |

FOREIGN PATENT DOCUMENTS

| | | | | |
|---|---|---|---|---|
| CN | 103269429 A | * | 8/2013 | |
| CN | 107193938 A | * | 9/2017 | |
| EP | 1207464 A2 | * | 5/2002 | G06F 16/40 |

(Continued)

*Primary Examiner* — James E Richardson
(74) *Attorney, Agent, or Firm* — Adsero IP

(57) ABSTRACT

The present invention relates to a method for encoding a candidate vector for searching for a neighbor that is nearest to a query in a candidate dataset, the method comprising a normalization step of normalizing an input vector to obtain a direction vector and vector energy; a quantization step of quantizing the direction vector to obtain a code word and a residual vector; a step of repeating the normalization step and the quantization step, as many times as a predetermined number of encoding times, by using the residual vector as an input vector; and a step of encoding the candidate vector by using one or more code words and energy of one or more vectors resulting from the repetition. According to the present invention, a dataset having a very wide range of energy values can be effectively approximated and higher precision thereof can be obtained.

6 Claims, 6 Drawing Sheets

(56) References Cited

FOREIGN PATENT DOCUMENTS

JP 2013011920 A * 1/2013 ............. G06F 16/40
JP 5637939 B2 * 12/2014

* cited by examiner (a) Normalized vector quantization (b) Additive quantization

METHOD FOR ENCODING BASED ON MIXTURE OF VECTOR QUANTIZATION AND NEAREST NEIGHBOR SEARCH USING THEREOF

BACKGROUND OF THE INVENTION

1. Field of the Invention

The present invention relates to an information search or a multimedia search and, more particularly, to an encoding method based on a mixture of vector quantization and a nearest neighbor search (NNS) method using the same.

2. Description of the Prior Art

A nearest neighbor search (NNS) method is a greatly important issue that has been studied in many computer fields. Due to the fundamental role it plays in several fields, this issue generally arises in a wide range of subjects, such as database, machine learning, computer vision, and information retrieval. The nearest neighbor search problem can be simply defined as follows. When a query vector (q ∈RD), and n candidate vectors that are under the same dimensionality are given, it is required to return sample(s) for the query that are spatially closest to it according to a certain metric (usually l1-distance or l2-distance).

It is possible that the nearest neighbor can be identified by a linear scan (search) over the whole candidate set. However, its time complexity is O(n·D). Although the time complexity of the linear search linearly increases with respect to the dimensionality and the scale of a data set, the time complexity actually grows quadratically as both the dimensionality and data increase. As a result, a real-time search is hardly achievable on high dimensional, large-scale and dense vector space. In this case, most of the traditional approaches, such as K-D tree, R-tree, and Locality Sensitive Hashing (LSH) are unable to return decent results.

Over the past several years, a method based on vectors has become more and more popular due to its simplicity, considerably lower space complexity, and encouraging performance on high dimensional data. Representative methods include Product Quantizer (PQ), Additive Quantizer (AQ), and Combined Quantizer (CQ).

PQ decomposes a high dimensional vector into several segments. Each segment (a sub-vector) is quantized by a quantizer that is trained in the corresponding sub-space. Finally, the original vector is approximated by a concatenation of a series of closest codewords from these sub-space quantizers. The distances between a query and the candidate vectors are approximated by the distances between the query and the closest codewords in the sub-space.

Different from PQ, AQ and CQ do not divide vectors into segments. Both AQ and CQ represent vectors by a sum of several element vectors that are in the same dimension. These element vectors are selected from a series of pre-trained codebooks (at most one vector is selected from one codebook).

Similar to PQ, the distance between the query and the candidate vectors is approximated by the sum of distances between the query and these selected element vectors, which could be computed efficiently by checking a look-up table.

The quantization approach has two advantages. On one hand, the candidate vectors have been compressed (usually the memory consumption drops down by one order of magnitude), which makes it possible to load the whole reference set into a memory to support a fast search. On the other hand, the distance computation between the query and all the candidates becomes very efficient when it is approximated by a distance calculation between the query and codebook codewords.

Unfortunately, for these quantization-based approaches, there is an implicit assumption that the data are indexed. Since only a very limited number of codewords are used in the quantization, which is due to the concern of computational costs, the quantization is unable to make a proper approximation for all the vectors that span across a wide spectrum of energies.

For example, given vectors $[0.1, 0.03, ---]_{1 \times 128}$ and $[55, 122, ---]_{1 \times 128}$, they are in quite different vector lengths. Due to a wide energy gap, the conventional approaches can approximate only one vector and cannot approximate the other one. As a consequence, for AQ, CQ, and PQ, a low approximation error is hardly achievable in the general case where the energy distribution spans a wide range. Further, current compression schemes such as AQ, CQ, and PQ only address the issue of vector encoding. When conducting the NNS with either of them, an exhaustive comparison between the query and encoded candidates is inevitable, which is hardly scalable to a large-scale search task.

SUMMARY OF THE INVENTION

The present invention has been made to solve the problem and an aspect of the present invention is to provide an encoding method of effectively approximating a data set having an energy value of a very wide range and acquiring higher accuracy.

Further, another aspect of the present invention is to provide an encoding method of constructing indexes of an inverse list.

In addition, still another aspect of the present invention is to provide an encoding method of simplifying encoding training and quantization processes for vector quantization and acquiring high encoding accuracy.

Moreover, yet another aspect of the present invention is to provide a nearest neighbor search method of simplifying calculations of a distance between a query and a candidate vector and improving a search speed.

In order to achieve the above aspects, the present invention provides a method of encoding a candidate vector to search for a nearest neighbor of a query in a candidate data set. The method include: normalizing an input vector (at this time, the initial input vector is the candidate vector) to acquire a direction vector and vector energy by normalizing; quantizing the direction vector to acquire a codeword and a residual vector; repeatedly performing the normalizing of the input vector and the quantizing of the direction vector by a preset encoding order based on the input vector corresponding to the residual vector; and encoding the candidate vector by using one or more codewords and energy of one or more vectors by the repeated performing of the normalizing of the input vector and the quantizing of the direction vector.

The present invention provides a method of searching for a nearest neighbor of a query in a candidate data set. The method includes: calculating distances between the query and indexing keys of an inverse list including one or more codewords acquired by normalizing and quantizing the query; arranging the calculated distances in an ascending order and setting an inverse list of the arranged distances within a particular top percentile as a candidate connection list; and acquiring the nearest neighbor by calculating distances between candidate vectors included in the candidate connection list and the query.

According to the above described present invention, it is possible to effectively approximate a data set having an energy value of a very large wide range and acquire higher accuracy.

According to the present invention, it is possible to construct indexes of an inverse list.

According to the present invention, it is possible to simplify encoding training and quantization processes for vector quantization and acquire a higher encoding accuracy.

According to the present invention, it is possible to simplify calculations of a distance between a query and a candidate vector and improve a search speed.

DETAILED DESCRIPTION OF THE EXEMPLARY EMBODIMENTS

Figure 1:
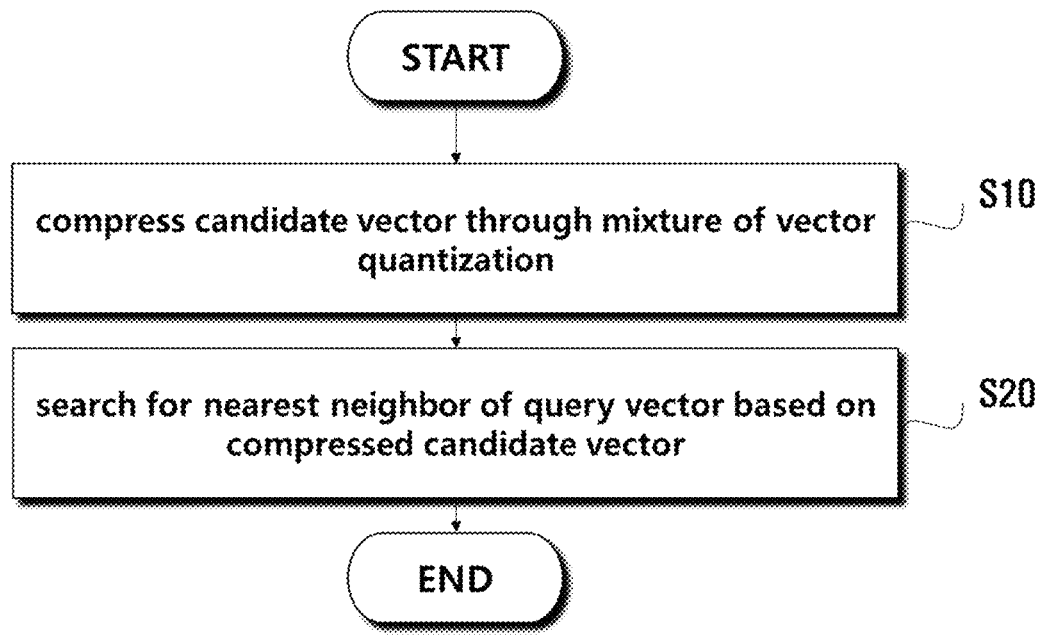
FIG. 1 is a flowchart schematically illustrating a nearest neighbor search method according to an embodiment of the present invention.
Figure 2:
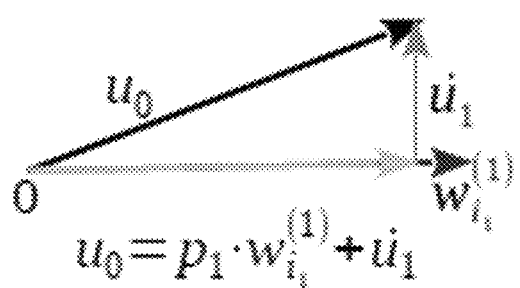
FIG. 2 illustrates normalization vector quantization according to an embodiment of the present invention.
Figure 2:
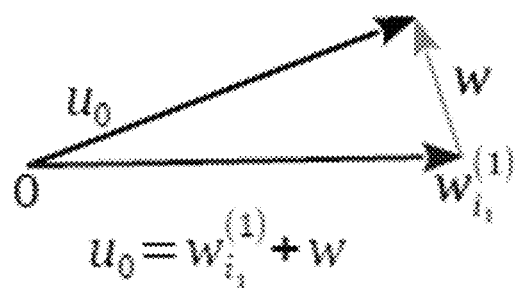

The aforementioned objectives, features, and advantages will be described in detail with reference to the accompanying drawings and, accordingly, the technical idea of the present invention can be easily implemented by those skilled in the art. In the description of the present invention, when it is determined that a specific description of known technologies related to the present invention obscures the substance of the present invention, the detailed description thereof will be omitted.

In the drawings, the same reference numeral is used to indicate the same or similar element, and all combinations described in the specification and claims may be made in a predetermined way. Unless defined otherwise, it may be understood that the singular form may imply one or more and the singular expression includes the plural expression.

The present invention proposes a Residual Vector Quantization (RVQ)-based method to solve the above problem. An aspect of the present invention is to solve the nearest neighbor search (NNS) problem in two aspects, that is, both of the encoding and indexing stages.

RVQ corresponds to a method of approaching an original vector by recursively quantizing a residual vector that is gained from a prior quantization stage. Based on an experiment, through simple training, it has been derived that a simple design of RVQ can acquire a result similar to that of AQ, CQ, and SQ, all of which require complicated training.

Further, the present invention can be applied to a case where the conventional RVQ is improved and energies of vectors to be indexed span a wide range.

In a recursive normalized vector quantization (hereinafter, referred to as "RNQ") method according to an embodiment of the present invention, the vector and the residual vector are normalized before the quantization is undertaken, and a direction and an energy of the vector are quantized (encoded) separately after the direction and the energy of the vector are acquired.

The NNS method according to the present invention uses a mixture encoding with RVQ and RNQ. Specifically, the lower order residual vectors are encoded by RVQ. The remaining higher order residual vectors are encoded with RNQ. This design has advantages in the encoding efficiency of RVQ in its lower order as well as having a low encoding error of RNQ. In the online search, RVQ codes from the lower order are combined into an inverted indexing key of an inverted list.

The present invention relates to a result of a comprehensive study on the configuration of the RVQ codebook (configuration of encoding) in order to build a distinctive indexing key to facilitate the fast NNS.

A careful configuration of the codebook size of each order would lead to a considerable drop in encoding error. The present invention is more significant than a sophisticated weighting scheme. In connection with the content of the present invention, it was discovered that building the inverted key from multiple orders of small codebooks is more favorable than building the key from single order with a big codebook. This is because the former leads to a significant lower quantization cost and encoding error. In addition, it turns out to be very convenient to scale up to trillion level search tasks with such a multi-order key generation scheme.

A main disadvantage of the tree partitioning approaches is the heavy demand for memory. On one hand, in order to support fast comparison, all the candidate vectors are loaded into the memory. On the other hand, tree nodes used for indexing also take up a considerable amount of extra memory. Overall, the memory consumption is bigger than the size of the reference set.

Apart from the tree partitioning approach, several attempts have been made to apply locality sensitive hashing (LSH) to the NNS. In general, there are two steps involved in the search stage. Step 1 collects candidates that share the same or similar hash keys as the query, and step 2 performs an exhaustive comparison between the query and all the selected candidates to find out the nearest neighbor. The LSH is good for an application that only requires an approximate nearest neighbor. Moreover, in order to support the fast comparison in step 2, the whole reference set is required to be loaded in the memory, which leads to a lot of memory consumption.

In recent years, the problem of the NNS is addressed by vector quantization. A technology for applying the product quantizer opens up new way to solve this decades old problem.

In the nearest neighbor search of the query according to the present invention, the candidate vectors are all compressed through the encoding based on a mixture of vector quantization (RVQ and RNQ) in S10, and the nearest neighbor search of the query is conducted based on the compressed candidate vectors in S20 as illustrated in FIG. 1.

Further, the distance between the query and the candidate vectors compressed in step 20 is approximated by the distance between the query and codewords.

Hereinafter, the encoding based on the mixture of vector quantization in step 10 according to an embodiment of the present invention will be described with reference to FIGS. 2 to 7, and the nearest neighbor search method using the encoding will be described in more detail with reference to FIG. 8.

In order to describe the encoding based on the mixture of vector quantization, residual vector quantization (RVQ) is first reviewed in this specification. Thereafter, a variant of RVQ is presented, in which the residual vector is normalized before the residual vector is quantized at each stage. Furthermore, a method of calculating a distance between an uncompressed query and a candidate vector compressed by RVQ and RNQ is presented.

A. Residual Vector Quantization (RVQ)

The idea of approximating vectors by the composition of several vectors can be traced back to the design of "two-stage residual vector quantization". In this scheme, an input vector is encoded by a quantizer, and its residue (quantization error) is sequentially encoded by another quantizer. This scheme has been extended to several orders (stages), in which the residual vector that is left over from the prior quantization stage is quantized recursively.

Given vector $V \in R^D$, and a series of codebooks $V_1$, $V_2, \ldots, V_k$, vector v is approximated by a composition of codewords from the codebooks. In particular, one codeword is selected from one stage codebook. If this recursive quantization is repeated to a kth stage, vector v is approximated as shown in equation (1) below.

$$v \approx w_{i_1}^{(1)} + \ldots + w_{i_m}^{(m)} + \ldots w_{i_k}^{(k)} \quad \text{[Equation 1]}$$

In equation (1), $V_m$ in stage m is trained from the residues $$r = v - \sum_{j=1}^{(m-1)} w_{i_k}^{(j)}$$

collected from stage m−1.

Several schemes have been proposed to decrease quantization errors of RVQ. According to the document of C. F. Barnes, S. A. Rizvi, and N. M. Nasrabadi, "Advances in residual vector quantization: a review.," IEEE Transactions on Image Processing, vol. 5, no. 2, pp. 226262, 1996. (hereinafter, referred to as reference document 1) and the document of W.-Y. Chan and A. Gersho, "Enhanced multi-stage vector quantization with constrained storage," in Twenty-Fourth Asilomar Conference on Signals, System and Computing, pp. 659663, November 1990. (hereinafter, referred to as reference document 2), the codebooks of multiple stages are optimized through joint training.

According to an embodiment of the present invention, we only consider a simple implementation of RVQ, in which the codebook in each stage is trained independently from the residues collected from the previous stage. Joint optimization proposed in reference document 1 and reference document 2 may further boost the performance.

Although simple, RVQ has advantages over recent compositional compression approaches, such as AQ and CQ. For these methods, the energy of a vector is randomly distributed to different quantizers. Different from AQ, CQ, or PQ, PVQ keeps more energy of the original vector in its lower stage quantizers.

RVQ actually forms a coarse-to-fine compression over the original vector. In other words, the codes of the lower stages carry more information than the codes of the higher stages. As a result, the codes from the lower stage are particularly suitable to be used as the indexing key to build inverted files, which facilitates a fast ANN search.

Meanwhile, these codes may partition the space as best they can such that vectors are sparsely distributed to different inverted lists. On the other hand, the length of the indexing key is minimally controlled, which makes the scale of an inverted file structure as small as possible.

B. Recursive Normalized vector Quantization (RNQ)

Due to the limited number of codewords which can be used in one stage of quantization, the residual space at each stage may not be well quantized. This is particularly true when the energies of residues span a wide range. In order to solve the problem, it is preferable to 12-normalize the residual vector before it is fed to quantization according to an embodiment. In other words, the energy of a vector and its unit length vector are quantized separately, which makes the quantization easier.

Given vector $V \in R^D$, it is written as $$v = e_0 \cdot \frac{v}{\|v\|_2},$$

where $e_0 = \|v\|_2$ keeps the energy of a vector. Different from AQ, PQ, and CQ, the energy $e_0$ of a vector and its normalized vector (that is, direction vector)

$$\frac{v}{\|v_2\|}$$

will be encoded separately. Since e is a scalar, e is easy to be encoded and indexed.

Hereinafter, how to encode the unit length vector $$u_0 = \frac{v}{\|v_2\|}$$

will be mainly described.

A pre-trained codebook is $\{w_{i_1}^{(1)}, \ldots, w_{i_m}^{(m)}, \ldots, w_{i_k}^{(k)}\}$, $w_{i_1}^{(1)} \in R^D$, and $\|w_{i_1}^{(1)}\|_2 = 1$. A quantization function $Q(x, V)$ returns a nearest neighbor from the codebook V for the vector x. Accordingly, a vector u is represented as shown in equation (2) below.

$$u_0 = p_1 \cdot Q(u_0, V_1) + \dot{u}_1 \quad \text{[Equation 2]}$$

When $p_1 = \cos(u_0, Q(u_0, V_1))$ and $\dot{u}_1$ is a residual vector that is orthogonal to a vector $Q(u_0, V_1)$, equation (2) above may be defined as equation (3) in consideration of $w_{i_1}^{(1)} = Q(u_0, V_1)$.

$$u_0 = p_1 \cdot w_{i_1}^{(1)} + \dot{u}_1 \quad \text{[Equation 3]}$$

FIG. 2A illustrates vectors $u_0$, $w_{i_1}^{(1)}$, and $\dot{u}_1$, and their relation in the 2D space. The residual vector $\dot{u}_1$ may be further approximated in the same fashion. When $e_1$ keeps energy of $\dot{u}_1$ and $u_1$ is an $l_2$-normalized vector in consideration of $\dot{u}_1 = e_1 \cdot u_1$, $u_1$ is approximated as equation (4) below.

$$u_1 = p_2 \cdot w_{i_2}^{(2)} + \dot{u}_2 \quad \text{[Equation 4]}$$

When $w_{i_2}^{(2)}$ is the closest codeword to $u_1$ in another codebook $V_2$, $u_0$ is represented as equation (5) below.

$$u_0 = p_1 \cdot w_{i_1}^{(1)} + e_1 \cdot (p_2 \cdot w_{i_2}^{(2)} + \dot{u}_2) \quad \text{[Equation 5]}$$

Likewise, it is very natural to extend the encoding process into even a higher order as shown in equation (6).

$$u_0 = p_1 \cdot w_{i_1}^{(1)} + e_1 \cdot (p_2 \cdot w_{i_2}^{(2)} + e_2 \cdot (p_3 \cdot w_{i_3}^{(3)} + \dot{u}_3)) \quad \text{[Equation 6]}$$

When the approximation stops at a 4th order, we can acquire equation (7) below.

$$u_0 \approx p_1 \cdot w_{i_1}^{(1)} + e_1 \cdot (p_2 \cdot w_{i_2}^{(2)} + e_2 \cdot (p_3 \cdot w_{i_3}^{(3)} + e_3 \cdot p_4 \cdot w_{i_4}^{(4)})) \quad \text{[Equation 7]}$$

The approximation of the vector $u_0$ is indicated by $\hat{u}_0$. In equation (7), $p_i$ and $e_i$ are the Cosine and Sine between a vector $u_{i-1}$ and a codeword $w_i$. As a result, they are coupled. That means that, once one of them is known, the other is fixed. This provides convenience in encoding. An encoding apparatus only needs to perform scalar quantization either on $p_i$ series or $e_i$ series.

In equation (7), since $p_i$ and $e_i$ are all in the range of [0, 1], the real energy that is kept in mth order is $$e_0 \sum_{j=1}^{m-1} e_j \cdot p_m,$$

which is no bigger than the energy kept in the prior order. Accordingly, multiple orders of RNQ are similar to RVQ that forms a coarse-to-fine partition over the vector space.

Figure 3:
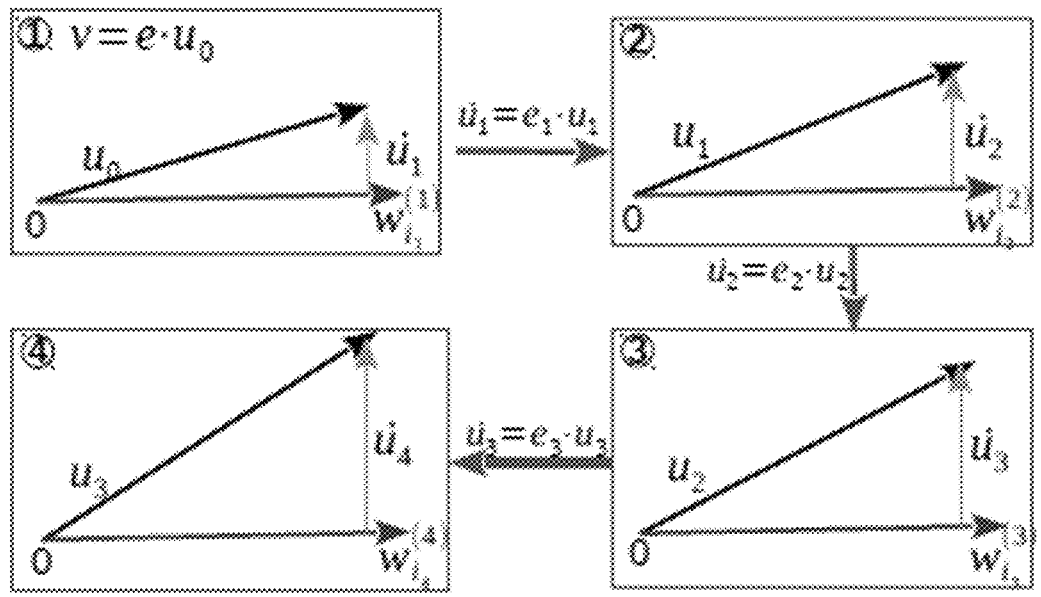
FIG. 3 illustrates recursive approximation according to an embodiment of the present invention.
Figure 4:
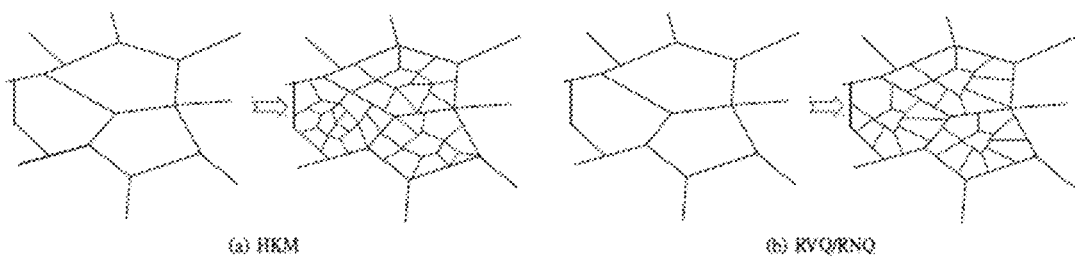
FIG. 4 illustrates a comparison between an encoding result based on a mixture of vector quantization and HKM according to an embodiment of the present invention.

FIG. 3 illustrates the approximation from the first order to the 4th order. The original vector v is represented as $e \cdot \hat{u}_0$.

Overall, the major difference between the encoding according to an embodiment of the present invention and RVQ is that this scheme approximates a vector by its projection on a codebook codeword instead of the codebook codeword.

Compared to the conventional compositional approaches, the present invention requires extra bits to encode the energy. However, this does not induce heavy memory consumption. Based on an experiment result according to an embodiment of the present invention, typically 4 bits are sufficient to encode the energy of each order.

In order to approximate a vector with n orders of quantizer, n codebooks are required. These codebooks are trained by collecting the normalized residues from the previous stage.

In the training in each order, k-means clustering may be used. After the k-means clustering, the clustering centroids are $l_2$-normalized into a unit length and are used as the encoding codewords.

The new encoding scheme is called recursive normalized quantization (RNQ).

C. Mixture Encoding with RNQ and RVQ

In a case of RNQ, the encoding error is considerably smaller than RVQ, but extra 4 bits are required in each order. In general, for the fast NNS, the inverted indexing key is generated from the first 2 orders of RNQ/RVQ codes. As a result, the inverted key will be 8 bits longer than that of RVQ. Although the indexing key is more distinctive than that of RVQ, the volume of a key space key will be 256 times larger than that of RVQ, which splits the vector space unnecessarily sparsely. For this reason, in the fast NNS, the apparatus according to the present invention prefers to make a mixture encoding for a given vector. Typically, RVQ is adopted for the first two orders of the encoding, which will be used to produce the indexing key.

The residues left over from two-order RVQ are further encoded with RNQ. As a result, the vector is approximated with 4 orders and the approximation is written as equation (8) below.

$$v \approx w_{i_1}^{(1)} + w_{i_2}^{(2)} + e_0 \cdot (p_1 \cdot w_{i_3}^{(3)} + e_1 \cdot (p_2 \cdot w_{i_4}^{(4)})) \quad \text{[Equation 8]}$$

Figure 5:
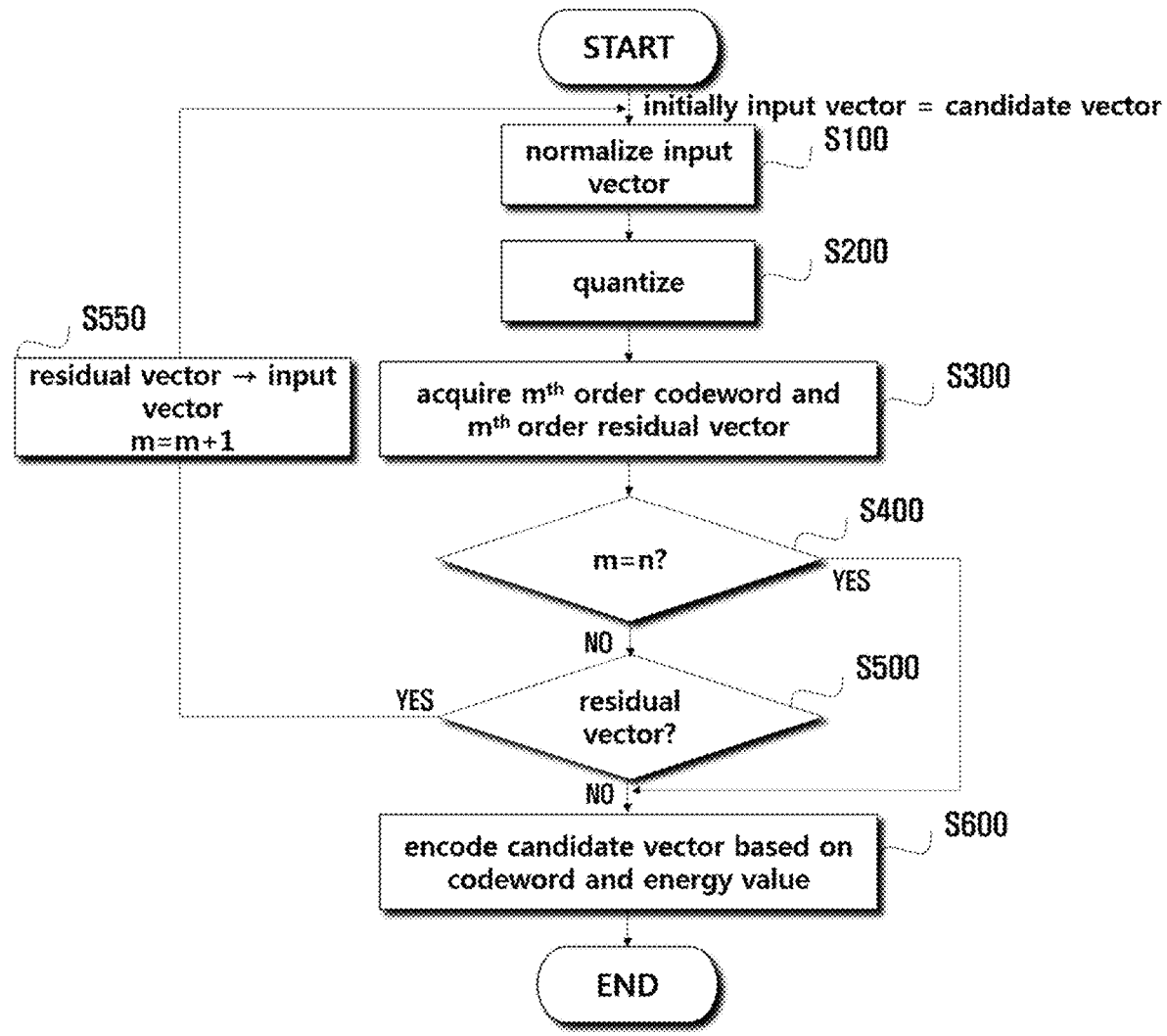
FIG. 5 is a flowchart illustrating a vector encoding method based on a mixture of vector quantization.
Figure 6:
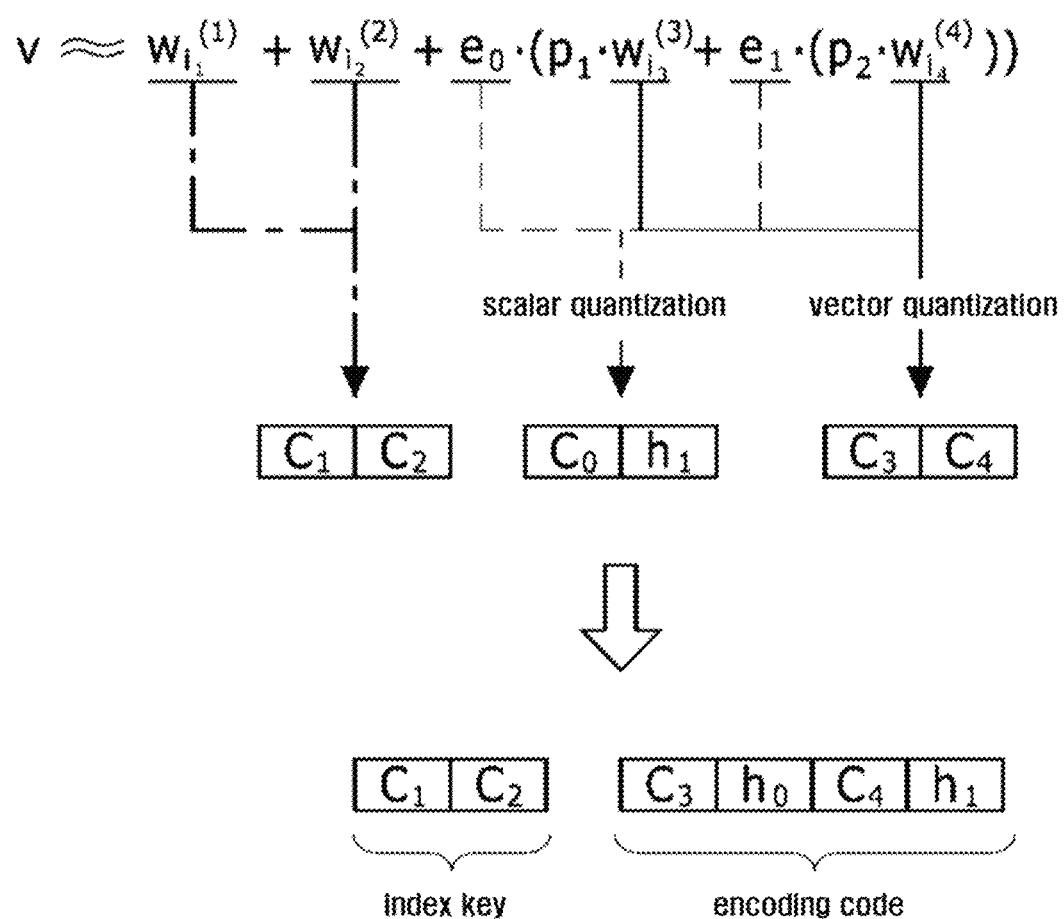
FIG. 6 illustrates a vector encoding method according to an embodiment of the present invention.

The mixture encoding method is illustrated in FIGS. 5 and 6, and the encoding method of the vector including A to C may be described below with reference to FIG. 5.

First, if an input vector $$v = e_0 \cdot \frac{v}{\|v\|_2}$$

is normalized, a vector energy $e_0 = \|v\|_2$ and a direction vector $$\frac{v}{\|v_2\|}$$

having a scalar value may be acquired in S100.

Next, the direction vector is quantized in S200 and an mth codeword and an mth residual vector may be acquired in S300. Step 200 is the same as the description made in B. recursive vector quantization.

For example, when a candidate vector v is initially input, a direction vector $u_0$ may be acquired through normalization, and a codeword $w_{i_1}^{(1)} = Q(u_0, V_1)$ and a residual vector $\dot{u}_1$ may be acquired by quantizing the direction vector.

When the direction vector is input, a quantization function returns a nearest neighbor (codeword) to the direction vector among the codewords included in a codebook corresponding to the direction vector. A quantization error left over in the quantization stage is called a residual vector, which corresponds to $\dot{u}_1$ in equation (2) described above. The residual vector may be orthogonal to the codeword returned by the quantization function. For reference, according to the present invention, the residual vector is recursively quantized by several orders. In this specification, all the repeated orders may be named an encoding order and the encoding order n may vary depending on approximation settings.

In the next stage, when a current order m is smaller than the encoding order n in S400, the order m increases to m+1, and the mth residual vector passes through normalization and quantization processes through steps 100 to 300. Accordingly, steps 100 to 300 are repeated by the encoding order n. In the RNQ according to an embodiment of the present invention, n codebooks may be required and n codewords may be acquired through the RNQ.

In step 600, candidate vectors may be encoded using one or more codewords and energies of one or more vectors through the repetition of steps 100 to 300.

Step 600 will be described in more detail with reference to FIG. 6. FIG. 6 illustrates the framework of a mixture encoding with RVQ and RNQ to improve the convenience of indexing and encoding. For clarity of the description, only four encoding orders are shown for each in FIG. 6. In order to achieve high NNS quality, it can be extended to a higher order. In FIG. 6, $h_j$ denotes a scalar quantization value for the energy of one order.

First, the encoding order n may be classified into a lower order i and a higher order j according to the set reference. That is, n=i+j, where j may be determined by a detailed problem, and i may increase when a candidate data set to be searched for is large. The reason is that the lower order i is used as an index of an inverse indexing structure and, as i is larger, the number of generated index values increases and an amount of data to be indexed increases. This is to access only a few of candidate vectors in the nearest neighbor query every time by scattering a data set as much as possible.

Next, an indexing key of an inverse list may be generated using codewords corresponding to the input vector of the lower order. For example, in the example of FIG. 5 in which n=4, i=2, and j=2, the candidate vector may be approximated as equation (7) and the lower order i=2, which means the 1st order and the 2nd order. Accordingly, the codewords corresponding to the input vector of the lower order are $w_{i_1}^{(1)}$ and $w_{i_2}^{(2)}$. That is, the indexing key may be set as $C_1C_2$ through a combination of $w_{i_1}^{(1)}$ and $w_{i_2}^{(2)}$.

$w_{i_1}^{(1)}$ denotes the nearest codeword to directions of a residues in the 1st order codebook, and $w_{i_2}^{(2)}$ denotes the nearest codeword to directions of residues in the 2nd order codebook.

Next, an RNQ code may be generated using codewords corresponding to the input vector of the higher order and vector energy corresponding to the input vector of the lower order. In the above example, j=2, means that the higher order corresponds to a 3rd order or a 4th order. Accordingly, codewords $w_{i_3}^{(3)}$ and $w_{i_4}^{(4)}$ may be used for generating the RNQ code. $w_{i_3}^{(3)}$ is the nearest codeword to directions of residues in the $3^{rd}$ order codebook ($V_3$), and $w_{i_4}^{(4)}$ is the nearest codeword to directions the direction vector of residues in the $4^{th}$ order codebook ($V_4$)

Further, a vector energy value may be used. $e_0$ may be energy (scalar value) of the $3^{rd}$ residual vector, $e_1$ may be energy (scalar value) of the 4th residual vector.

$p_1$ and $p_2$ may be $p_1 = \cos(u_0, w_{i_1}^{(1)})$ and $p_2 = \cos(u_1, w_{i_2}^{(2)})$ as described in section B, which correspond to projections of residual directions on $w_{i_3}^{(3)}$ and $w_{i_4}^{(4)}$ respectively.

Through a combination of the scalar quantization value and the vector quantization value of the higher order, the RNQ code (encoding code) may be generated, which is $C_3h_0C_4h_1$ according to the embodiment of FIG. 6.

That is, the candidate vector may be encoded by $C_1C_2C_3h_0C_4h_1$ corresponding to the combination of the indexing key and the RNQ code. As described above, $C_1$ and $C_2$ are codes after the residual vector is quantized, and the two codes may be added to an indexing key of an inverse list. The remaining code $C_3h_0C_4h_1$ may be stored in a connection list corresponding to the corresponding key value of the inverse list, and each item of the connection list may store identification information of the candidate vector and the RNQ code. For example, in the above embodiment in which n=4, each candidate item of the connection list may be <ID, $C_3h_0C_4h_1$>.

Figure 7:
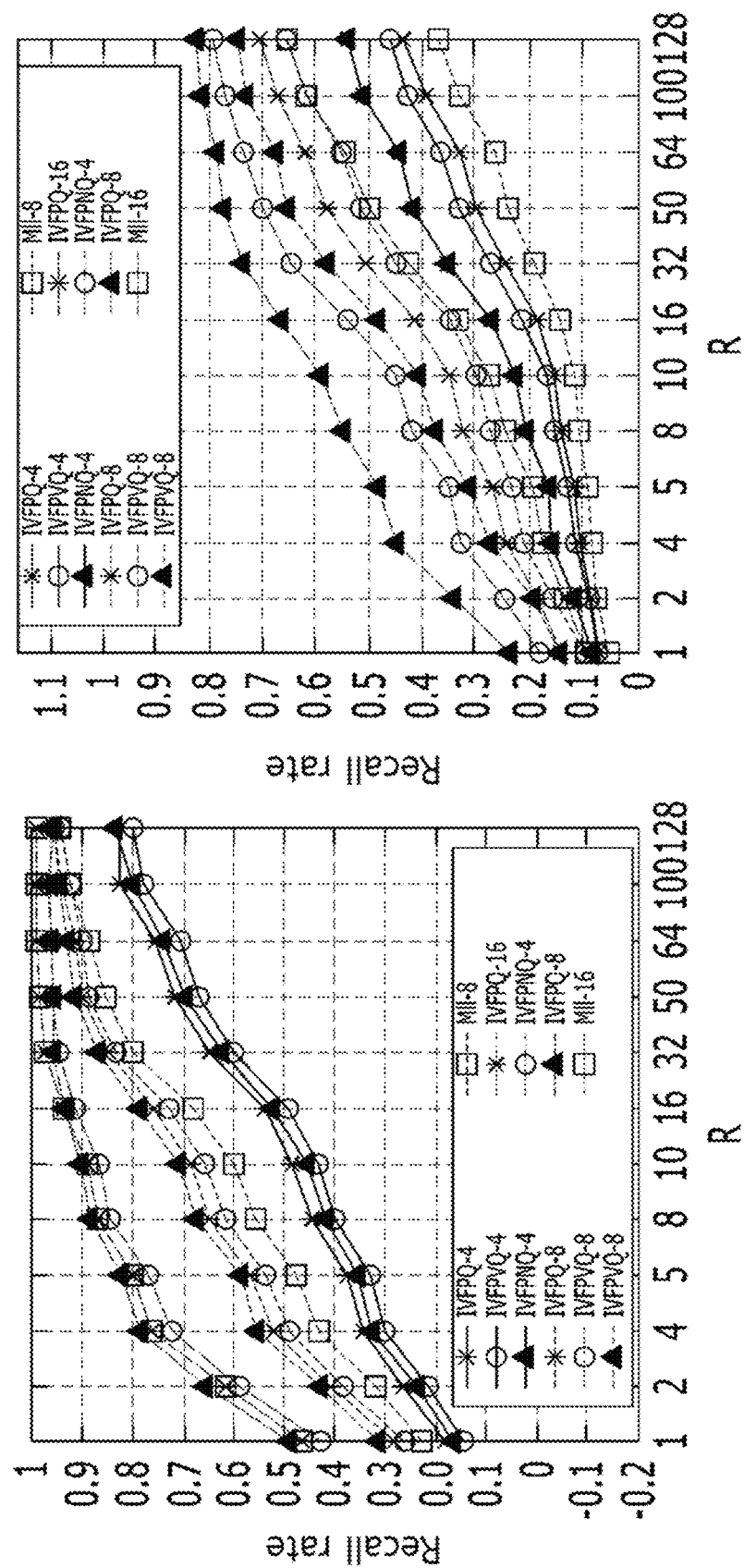
FIG. 7 illustrates a comparison between a result according to an encoding based on a mixture of vector quantization with results of IVFPQ, IVFRVQ, and IMI in SIFT1M and GIST1M data sets according to an embodiment of the present invention.
Figure 8:
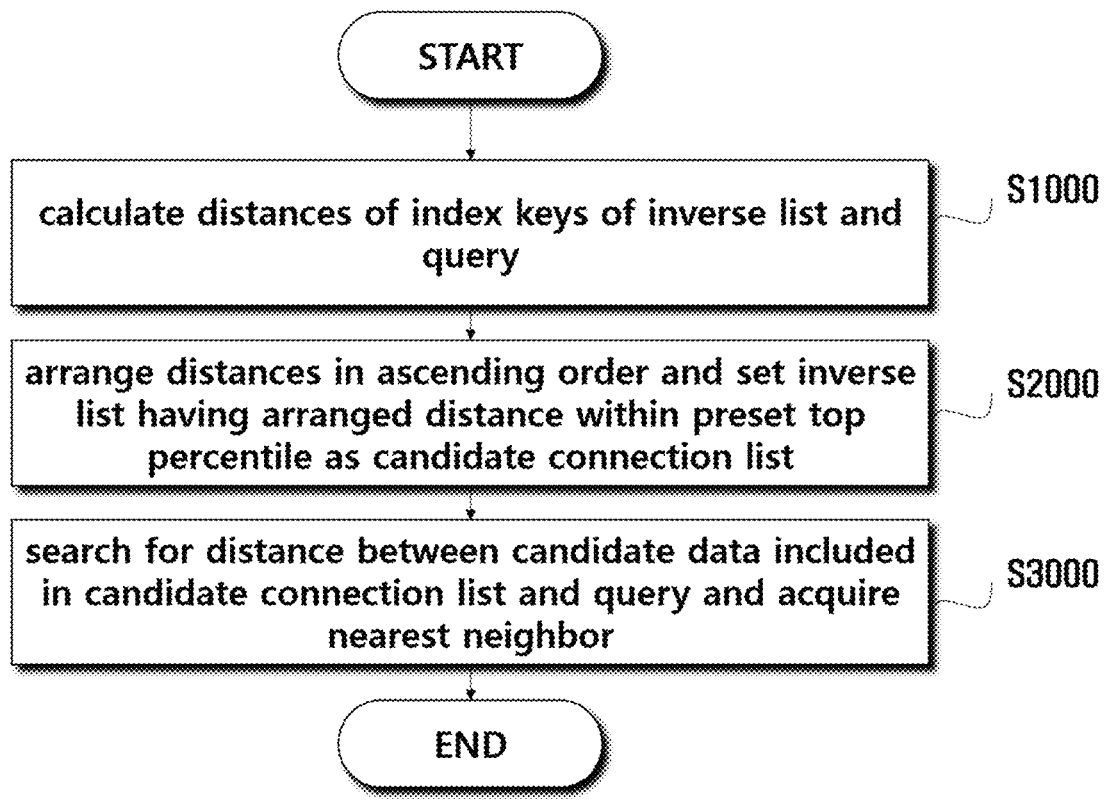
FIG. 8 is a flowchart illustrating a nearest neighbor search method using an encoding based on a mixture of vector quantization according to an embodiment of the present invention.

As illustrated in FIG. 7, in most layout situations, a recall rate of the mixture of vector quantization is the highest and the mixture of vector quantization is more excellent than any other method in a GISTIM data set in particular. The encodings of IVFRVQ and MXQ are similar to each other. However, a result of the MXQ is more excellent than the IVFRVQ, which shows that separately encoding the direction and energy of the residual vector is more effective than the RVQ.

A method corresponding to the IVFPQ has been proposed by H. Jegou (Product quantization for neighbor search, in: IEEE transactions on pattern analysis and machine intelligence, 2011, 33(1):117-128).

A method corresponding to the IVFRVQ has been proposed by Y. Chen (Approximate nearest neighbor search by residual vector quantization, in: Sensors, vol. 10, pp. 11259-11273, 2010).

A method corresponding to the IMI has been proposed by A. Babenko (The inverted multi-index, in: Computer Vision and Pattern Recognition (CVPR), 2012 IEEE, 2012:3069-3076).

Nearest Neighbor Search Method

An online search strategy based on level pruning will be described with reference to FIG. 8. In order to search for a nearest neighbor of q in a candidate data set, a distance between an index key of an inverse list and the query is calculated in step 1000. At this time, the index key value I may be divided into $C_1$ and $C_2$. $C_1$ and $C_2$ correspond to a vector of a 1st order codebook (first codeword $w_{c_1}^{(1)}$) and a vector of a 2nd order codebook (second codeword $w_{c_2}^{(2)}$), respectively, and the calculation of the distance between the query q and I may be replaced with a calculation of a distance between the query q and a synthesized vector $I = w_{c_1}^{(1)} + w_{c_2}^{(2)}$.

For example, the distance between q and the synthesized vector I may be represented as the following equation.

[Equation 9]

$$d(q, I) = d(q, w_{c_1}^{(1)} + w_{c_2}^{(2)})$$
$$d(q, I) = d(q, w_{c_1}^{(1)} + w_{c_2}^{(2)})$$
$$= \underbrace{qq^t - 2 \cdot w_{c_1}^{(1)} q^t - w_{c_1}^{(1)}}_{term1} - \underbrace{2 \cdot w_{c_2}^{(2)} q^t - w_{c_1}^{(1)} w_{c_2}^{(2)1}}_{term2} - w_{c_2}^{(2)2}$$

Stage to Increase a Calculation Speed

In equation (9) above, in order to increase the calculation speed, a distance between the query q and the first codeword $w_{c_1}^{(1)}$ may be first calculated (term 1 of equation (9)). Accordingly, a distance between the query q and each 1st order encoding code may be acquired, and the distance may be arranged according to the size. Index items corresponding to the bottom 95% 1st encoding codes may be ignored, and the distance between the query q and the synthesized vector I acquired based on the 2nd encoding codes may be calculated with respect to the remaining 5% 1st encoding codes. In the same way, after distances between the query q and the 2nd encoding codes are calculated, index items may be arranged according to the distances and the bottom 90% index items may be ignored. That is, the search may be performed in consideration of only a connection list within a particular top percentile in the inverse list. Such a scheme may extend to a case of i>2.

In equation (9), $w_{c_1}^{(1)} w_{c_2}^{(2)}$, $w_{c_2}^{(1)^2}$, and $w_{c_2}^{(2)^2}$ may be pre-calculated and, when a search is made in the list later, the calculation by equation (9) can be rapidly performed. This corresponds to arranging the distances in the ascending order and setting the inverse list having the arranged distances within the preset top percentile as the candidate connection list in step 2000 of FIG. 8.

Thereafter, a nearest neighbor may be acquired by calculating a distance between a candidate vector v included in the candidate connection list and a query q in S3000.

The calculation of the distance between the candidate vector v and the query q in step 3000 may be performed through equation (10) below and, accordingly, a nearest neighbor vector of the query q may be acquired by calculating the distance between the query q and the candidate vector v encoded according to an encoding method based on a mixture of vector quantization.

$$d(q, v) = \|q - v\|_2^2 \quad \text{Equation (10)}$$

$$= q \cdot q^t - 2 \cdot v \cdot q^t + v \cdot v^t$$

$$= q \cdot q^t - 2 \cdot$$

$$\left( w_{i_1}^{(1)} \cdot q^t + w_{i_2}^{(2)} \cdot q^t + e_0 \cdot \right.$$

$$\left. \left( p_1 \cdot w_{i_3}^{(3)} \cdot q^t + e_1 \cdot p_2 \cdot w_{i_4}^{(4)} \cdot q^t \right) \right) + v \cdot v^t$$

$$= q \cdot q^t + v \cdot v^t - 2 \cdot$$

$$(d(q, 1) + e_0 \cdot$$

$$\left( p_1 \cdot w_{i_3}^{(3)} \cdot q^t + e_1 * p_2 * w_{i_4}^{(4)} \cdot q^t \right))$$

Compared to the conventional quantization method, the encoding method based on the mixture of vector quantization according to the present invention uses the RVQ encoding for the former two orders and the latter two orders encode energy of the residual vector and the direction vector, respectively. According to the present invention, it is possible to construct indexes of the inverse list, more effectively approximate a data set having an energy value of a very wide range, and acquire higher accuracy.

Further, according to the nearest neighbor search strategy by the level pruning according to the present invention, it is possible to effectively reduce the number of candidate items required to calculate a query point and a distance and accelerate a search process.

Compared to the other conventional quantization method, the corresponding method of the present invention has more simple encoding training and quantization processes and may acquire relatively excellent encoding accuracy.

The methods described in this specification may be implemented by one or more computer programs executed by one or more processors. The computer programs include processor-executable instructions stored in a non-transitory tangible computer-readable medium. The computer programs may also include stored data. Unlimited examples of the non-transitory tangible computer-readable medium include a non-volatile memory system, a magnetic storage space, and an optic storage space.

What is claimed is:

1. A method of encoding a candidate vector to search for a nearest neighbor of a query in a candidate data set, the method comprising:

normalizing an input vector (at this time, the initial input vector is the candidate vector) to acquire a direction vector and vector energy by normalizing;

quantizing the direction vector to acquire a codeword and a residual vector;

repeatedly performing the normalizing of the input vector and the quantizing of the direction vector by a preset encoding order based on the input vector corresponding to the residual vector; and encoding the candidate vector by using one or more codewords and energy of one or more vectors by the repeated performing of the normalizing of the input vector and the quantizing of the direction vector, wherein encoding the candidate vector comprises:

classifying the encoding order into a lower order and a higher order according to a preset reference;

generating an indexing key of an inverse list by using a codeword corresponding to an input vector of the lower order; and generating a recursive normalized vector quantization ("RNQ") code by using a codeword corresponding to an input vector of the higher order and vector energy corresponding to the input vector of the lower order, and the encoded candidate vector is a combination of the indexing key and the RNQ code, and the encoding order is a sum of the lower order and the higher order.

2. The method of claim 1, wherein the quantizing of the direction vector comprises returning a nearest word to the direction vector in a codebook corresponding to an order of the direction vector.

3. The method of claim 1, wherein the RNQ code is stored in a connection list corresponding to the indexing key of the inverse list, and each item of the connection list includes identification information and an RNQ code of the candidate vector.

4. The method of claim 1, wherein the classifying of the encoding order comprises increasing a size of a value classified into the lower order as a size of the candidate data set becomes larger.

5. The method of claim 1, wherein, when the encoding order is set as 4, the lower order i is set as 2, and the higher order j is set as 2, the candidate vector is approximated as an equation of $v \approx w_{i_1}^{(1)} + w_{i_2}^{(2)} + e_0 \cdot (p_1 \cdot w_{i_3}^{(3)} + e_1 \cdot (p_2 \cdot w_{i_4}^{(4)}))$, the indexing key is generated as $C_1 C_2$ based on $C_1$ corresponding to $w_{i_1}^{(1)}$ and $C_2$ corresponding to $w_{i_2}^{(2)}$, and the RNQ code is generated as $C_3 h_0 C_4 h_1$ based on $h_0$ corresponding to $e_0$, $h_1$ corresponding to $e_1$, $C_3$ corresponding to $w_{i_3}^{(3)}$, and $C_4$ corresponding to $w_{i_4}^{(4)}$, $w_{i_1}^{(1)}$ being a nearest codeword to directions of residues in a 1st order codebook ($V_1$), $w_{i_2}^{(2)}$ being a nearest codeword to directions of residues in a 2nd order codebook ($V_2$), $w_{i_3}^{(3)}$ being a nearest codeword to directions of residues in a 3rd order codebook ($V_3$), $w_{i_4}^{(4)}$ being a nearest codeword to directions of residues in a 4th order codebook ($V_4$), $e_0$ being energy (scalar value) of a 3rd residual vector, $e_1$ being energy (scalar value) of a fourth residual vector, $p_1$ being a projection of residue directions on $w_{i_3}^{(3)}$, and $p_2$ being a projection of residue directions on $w_{i_4}^{(4)}$.

6. A non-transitory computer-readable medium storing a vector encoding application program to execute one of the methods of claim 1, 2, 3, 4 or 5.

* * * * *